(12) United States Patent
Chen et al.

(10) Patent No.: US 9,268,689 B1
(45) Date of Patent: Feb. 23, 2016

(54) SECURING VIRTUAL MACHINES WITH OPTIMIZED ANTI-VIRUS SCAN

(75) Inventors: Grace Jing Chen, Sunnyvale, CA (US); Ronald Karr, Palo Alto, CA (US); Venkeepuram Satish, Fremont, CA (US); Charles Paul Jerian, Palo Alto, CA (US); Pu Paul Zhang, San Jose, CA (US)

(73) Assignee: Symantec Corporation, Mountain View, CA (US)

( * ) Notice: Subject to any disclaimer, the term of this patent is extended or adjusted under 35 U.S.C. 154(b) by 526 days.

(21) Appl. No.: 13/429,891

(22) Filed: Mar. 26, 2012

(51) Int. Cl.
*G06F 12/00* (2006.01)
*G06F 12/02* (2006.01)
*G06F 12/10* (2006.01)

(52) U.S. Cl.
CPC ........ *G06F 12/0292* (2013.01); *G06F 12/1027* (2013.01)

(58) Field of Classification Search
CPC .......................... G06F 12/0292; G06F 12/1027
USPC ......................................................... 711/202
See application file for complete search history.

(56) References Cited

U.S. PATENT DOCUMENTS

| 2006/0242381 | A1* | 10/2006 | Shatskih | G06F 21/78 711/170 |
| 2011/0119763 | A1* | 5/2011 | Wade | G06F 21/566 726/24 |
| 2012/0221807 | A1* | 8/2012 | Wade | G06F 9/45558 711/154 |

* cited by examiner

*Primary Examiner* — Matthew Bradley
(74) *Attorney, Agent, or Firm* — Campbell Stephenson LLP

(57) ABSTRACT

The present disclosure provides for performing virus scans at a storage device that stores one or more virtual machine disk image files (VMDK files). A secure AV module can coordinate communication between a file system on the storage device, a file system (FS) decoder, and an anti-virus engine to perform a virus scan of files contained within a VMDK file. A secure AV module can determine a subset of files that include changed data, where the subset of files is stored in a file system volume within a VMDK file. The secure AV module can use an FS decoder to translate file addresses relative to the file system volume into file addresses relative to the network storage file system. A secure AV module can provide the network storage file system addresses of the subset of files to the anti-virus engine, which can perform a virus scan on the files.

20 Claims, 8 Drawing Sheets

SECURING VIRTUAL MACHINES WITH OPTIMIZED ANTI-VIRUS SCAN

FIELD OF THE INVENTION

This invention relates generally to performing virus scans and, more particularly, to performing virus scans of virtual machine backup images.

DESCRIPTION OF THE RELATED ART

Virtual machines, like physical machines, are subject to virus attacks. Viruses can be, for example, designed to replicate themselves by attaching themselves to non-virus software. More generally, a virus may be a program (or some unit of code; for example, instructions to which the machine responds, such as a code block, code element, code segment, or the like) that may attach to other programs and/or objects. A virus may also perform malicious (or simply unsolicited) actions on a machine system (at a minimum, illicitly consuming system resources). After a program has been infected with a virus, the virus can be executed each time the infected program is executed, and can spread. Allowing viruses to go undetected in a physical or a virtual machine can cause unexpected and harmful results, such as deletion of files, alteration of system settings, and consumed system resources.

SUMMARY OF THE INVENTION

The present disclosure provides for performing virus scans at a storage device that stores one or more virtual machine disk image files (VMDK files). A secure AV module can coordinate communication between a file system on the storage device, a file system (FS) decoder, and an anti-virus engine to perform a virus scan of files contained within a VMDK file. A secure AV module can determine a subset of files that include changed data, where the subset of files is stored in a file system volume within a VMDK file. The secure AV module can use an FS decoder to translate file addresses relative to the file system volume into file addresses relative to the network storage file system. A secure AV module can provide the network storage file system addresses of the subset of files to the anti-virus engine, which can perform a virus scan on the files.

BRIEF DESCRIPTION OF THE DRAWINGS

The present invention may be better understood, and its numerous objects, features and advantages made apparent to those skilled in the art by referencing the accompanying drawings.

Figure 1:
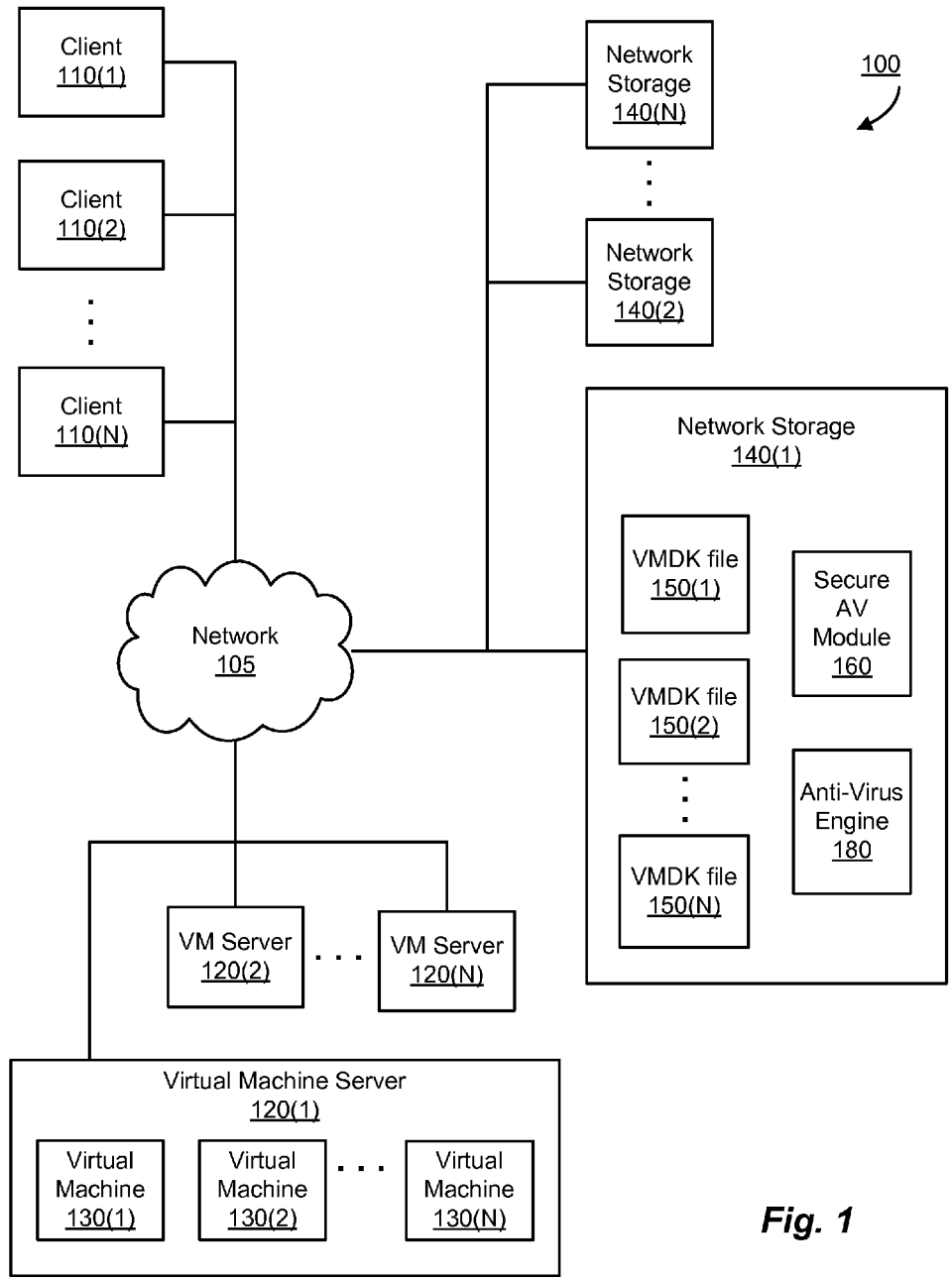
FIG. 1 is a block diagram illustrating relevant components of an example virtualization system in which the present disclosure can be implemented, according to one embodiment.

While the present disclosure is susceptible to various modifications and alternative forms, specific embodiments of the present disclosure are provided as examples in the drawings and detailed description. It should be understood that the drawings and detailed description are not intended to limit the present disclosure to the particular form disclosed. Instead, the intention is to cover all modifications, equivalents, and alternatives falling within the spirit and scope of the present disclosure as defined by the appended claims.

DETAILED DESCRIPTION

FIG. 1 is a block diagram illustrating relevant components of an example virtualization system 100, in which the present disclosure can be implemented. Virtualization system 100 includes a network 105 that communicatively couples one or more client devices 110(1)-(N), one or more virtual machine (VM) servers 120(1)-(N), and one or more network storage devices 140(1)-(N). Each component is discussed in further detail below.

One or more client devices 110(1)-(N), also referred to herein as client systems and/or clients, can be implemented using, for example, a desktop computer, a laptop computer, a workstation, a server, or the like. An example of such computing devices is described subsequently, in connection with FIG. 8. One or more clients 110(1)-(N) are configured to access one or more virtual machines 130(1)-(N) on virtual machine servers 120(1)-(N) via network 105. An example of network 105, which can be used by clients 110(1)-(N) to access the virtual machines 130(1)-(N) on VM servers 120(1)-(N), is a local area network (LAN) utilizing Ethernet, IEEE 802.11x, or some other communications protocol. As will be appreciated, network storage 140(1)-(N) can also be accessed by clients coupled directly thereto (not shown).

One or more virtual machines 130(1)-(N), referred to generally herein as a virtual machine or VM 130, are run on one or more virtual machine servers 120(1)-(N), referred to generally herein as a VM server 120. A virtual machine server 120 is a physical server on which virtual machines are instantiated. A virtual machine 130 can be a software implementation of a physical machine (e.g., computer), where a VM can execute its own operating system (OS) and applications as if it were a physical machine. Like a physical machine, the contents and structure of a virtual machine can be contained in a software container, also referred to herein as a virtual machine (VM) disk image. A VM disk image can be a single file that contains the complete contents and structure representing the hard disk drive of the virtual machine. A VM disk image can be stored in a virtual machine disk (VMDK) file format, also referred to herein as a VMDK image, a VMDK image file, or a VMDK file. Each VMDK file can be installed and executed on one or more VM servers 120(1)-(N). A VMDK file can be used to provision hundreds of virtual machines. Each VM server 120 can include a virtual machine manager, also known as a hypervisor (not shown), to manage the execution of the VMs 130(1)-(N) on a VM server 120. Multiple VMs can be instantiated on a VM server, and the multiple VMs can share the resources of the VM server. However, VMs are tightly isolated on a VM server, meaning that the software running inside a VM can be limited to the resources and abstractions defined within the VM.

One or more network storage devices 140(1)-(N), also referred to generally herein as network storage 140, can provide backend storage for multiple VMDK files 150(1)-(N). Each network storage device 140 can have a file system that can be responsible for organizing and managing files and folder on a network storage device. Each file system provides a structure in which files (e.g., VMDK files) of the network storage device are stored. In one embodiment, Veritas File System (VxFS, provided by Symantec Corporation of Mountain View, Calif.) can be the file system used in network storage 140. Each network storage device 140 can have a different file system. While references are made herein to VxFS implemented on network storage, other various file systems can be used.

In one embodiment, a VMDK file can include a single accessible storage area (e.g., a volume) with a single file system (e.g., NTFS file system). The VMDK file can be stored in a VxFS file system on network storage. NTFS (New Technology File System) is the standard file system of Windows NT® Operating System, provided by Microsoft Corporation of Redmond, Wash. Although reference is made herein to an NTFS file system for a VMDK file and a VxFS file system for network storage, other various file systems can be used, such as file systems used for Linux®, UNIX®, or other operating system implemented in a virtual machine or network storage.

Network storage 140 can be implemented as network attached storage (NAS), file servers, storage filers, and/or network shares. Network storage 140 can be implemented as a single storage device or as a collection of storage devices. Network storage 140 can also be implemented as a storage area network (SAN), which couples remote storage devices to a server (e.g., a storage server), such that the remote storage devices appear as locally-attached storage devices to the server's OS, for example. Network storage 140 can include a data volume, such as a cluster shared volume. In one embodiment, Symantec™ FileStore NAS system (provided by Symantec Corporation of Mountain View, Calif.) can be implemented as network storage 140.

While the present disclosure provides for various types of storage to be used as network storage 140, the present disclosure especially benefits from implementing network storage 140 as NAS, such as Symantec™ FileStore. Implementing the present disclosure on the NAS avoids using network resources to off-load a VM image to a VM server or other storage server to be instantiated and scanned for viruses. This also avoids using computing resources of a VM server or other storage server to perform the scan of the VM image. Instead, the computing resources of the NAS can be used to perform the scan, thereby using the computing resources that are closest to the files being scanned, and thus allowing important VM server computing and network resources to be available for client requests.

Virtual machines, like physical machines, are subject to virus attacks. A virtual machine (VM) can be scanned for viruses by running the VM on a VM server, installing anti-virus software on the VM, and performing a virus scan from inside the VM. This approach can be problematic for various reasons. For example, running the VM on a VM server uses computing resources (e.g., processor and memory usage) of the VM server to install and run the VM's disk image. If the VM disk image is not presently stored on the VM server, but instead is stored in backend storage on the network, the VM disk image must be transferred to the VM server via the network. In such a scenario, transferring the VM disk image to the VM server uses a large amount of network resources (e.g., bandwidth). The computing and network resources used to scan a VM increases greatly when a large number of VMs are scanned, especially if the VMs need to be scanned periodically.

Also, installing anti-virus software on each VM can be cost-prohibitive, especially if a large number of VMs are scanned and each VM requires an anti-virus software license. Further, if new anti-virus software were required for scanning, each VM would be required to install the new software and license, which can be time-consuming and resource-intensive. Each VM can also be required to update its anti-virus software definitions and download any new upgrades and/or patches for the installed anti-virus software, which would take up further computing and network resources. Thus, performing virus scans on VMs running on a VM server uses a large amount of computing and network resources. Implementing a secure AV module that can perform a virus scans of VM disk images directly on a storage device avoids transferring VM disk images over a network to a VM server for scanning. Thus, implementing secure AV module at the storage device that stores the VM disk images results in savings of network bandwidth and computing resources of VM servers.

Secure anti-virus (AV) module 160 can be implemented as a software module on one or more processors of network storage 140. Secure AV module can also be configured as having a client component that can run on a client device 110 and a server component that can run on network storage 140. The client component of the secure anti-virus module can provide a user interface on a client device for a user, where the user interface is configured to give the user access to functionality of the secure AV module (e.g., scheduling full and incremental virus scans, scheduling snapshots).

Secure AV module provides functionality to perform full and incremental virus scans on VMDK files stored in network storage, without requiring installation and execution of the VMDK files (i.e., without running the VM) on a VM server. For example, a secure AV module can automatically (i.e., without user intervention) initiate an initial snapshot of a file system according to a default schedule (e.g., every month, every two weeks, after a threshold amount of data has been written to the file system) and/or a schedule established by the user. The initial snapshot can also be initiated by a user or can be scheduled by the user via snapshot functionality provided by the file system of the network storage. The secure AV module can also automatically (i.e., without user intervention) schedule a virus scan to occur after an initial snapshot is performed. The virus scan can be a full virus scan. A virus scan can also be initiated by a user, and the secure AV module can be notified of the virus scan. The secure AV module can also automatically (i.e., without user intervention) schedule subsequent snapshots of the file system after the initial snapshot is performed. The subsequent snapshots can be scheduled according to a default schedule (e.g., every month, every two weeks, after a threshold amount of data has been written to the file system) and/or a schedule established by the user. The secure AV module can also automatically (i.e., without user intervention) schedule an incremental virus scan to occur after a subsequent snapshot is performed. The secure AV module can determine a subset of files that have changed since the last snapshot (e.g., initial snapshot) was performed and can provide the subset of files to the anti-virus engine, which can perform an incremental virus scan on the subset of files. The subset of files can be files contained within a VMDK file. The secure AV module can use FS decoder to translate file addresses of the files relative to one file system into file addresses relative to another file system. The secure AV module can also schedule a full virus scan to occur after a subsequent snapshot is performed.

Thus, secure AV module can provide this functionality by being configured to coordinate communication between a file system on the network storage, an anti-virus engine on the network storage, and a file system (FS) decoder implemented using a mapping service. In some embodiments, secure AV module provides processing logic that can be configured to retrieve information from a system (e.g., a file system), input information to a system (e.g., an FS decoder), and/or redirect outputted information from a system to another system (e.g., information output from FS decoder can be re-directed to anti-virus engine). Secure AV module 160 is discussed in further detail in reference to FIG. 2.

An anti-virus engine 180 can perform a virus scan of files using signature-based detection of viruses. Since anti-virus engine 180 can be implemented on network storage containing the VMDK files, the anti-virus engine can scan the VMDK files locally on network storage, as discussed below. Thus, only one license needs to be installed for the anti-virus engine on network storage, and only one instance of the anti-virus engine needs to be updated. Anti-virus engine 180 can examine contents of a file and search for known virus definitions, or patterns of data, within the file. If a known pattern of data is found in a file, the anti-virus engine determines the file is infected with a virus. If no patterns are found, the anti-virus engine determines the file is clean. In one embodiment, a signature can be calculated for a file, and then compared with known virus definitions to determine if the file is infected or not. If the signature of the file matches one of the known virus signatures, the anti-virus engine determines the file is infected. If the signature of the file does not match any of the known virus signatures, the anti-virus engine determines the file is clean. The anti-virus engine can report the results of the virus scan to a user or administrator. The anti-virus engine can also be configured to remove viruses or malware from files, such as computer viruses, computer worms, Trojan horses, spyware, and adware. In one embodiment, an anti-virus engine can be implemented using Norton™ AntiVirus software (available from Symantec Corporation of Mountain View, Calif.), although other third-party vendor software can be used.

An anti-virus engine can scan complex files that contain embedded documents, which are other files and data types stored as part of the complex file. The anti-virus engine can be configured to scan a complex file that contains various embedded documents by first decomposing the complex file, or by breaking the complex file down into file components of the complex file. For example, a complex file can be decomposed into component files, such as text files, graphics files (e.g., JPEG and GIF files), media files (e.g., MPEG and AVI files), sound files (e.g., MP3 and MIDI files), and the like. Anti-virus engine can then scan the decomposed file components of the file.

As a way to maximize efficiency of a virus scan, anti-virus engine 180 need not scan each file in a file system. Anti-virus engine can calculate a confidence score of a file and determine whether the file should be scanned. For example, some files (e.g., applications and system files) are guaranteed to be secure and virus-free by the vendor of the files, where the vendor provides a signed certificate with the files. The reputation of the vendor and the verification of the signed certificate can also be factored into the confidence score. The anti-virus engine can determine if the confidence score meets or exceeds a confidence threshold. If the confidence score indicates high confidence (i.e., the confidence score of the file exceeds a confidence threshold) that the file is not infected, anti-virus scan will not scan the file, even if the file is a changed file (as further discussed below). If the confidence score indicates low confidence (i.e., the confidence score of the file fails to meet the confidence threshold or falls below the threshold), the file will be scanned. A confidence score can be associated with a lifetime, so that the confidence score expires at the end of the lifetime. Once expired, a file associated with the expired confidence score will be re-scanned at some reasonable time in the future (e.g., after the next snapshot is taken). Similarly, a confidence score can decrease over time, so that a file corresponding to the confidence score will be re-scanned once the confidence score drops below the confidence threshold.

The confidence score can also take into account the importance of a new virus definition. Many new virus definitions are variations of a family of virus definitions, and may not differ much from the definitions of the family members. Thus, in such a case, the anti-virus engine can determine that a new scan using the new definition is unnecessary, since any virus corresponding to the new definition has likely been identified by a family member definition (e.g., the chance that a virus corresponding to the new definition went undetected in a file is sufficiently small enough to be ignored). However, if a new virus definition is received, and a virus corresponding to the new definition has likely been unidentified by any previously known definitions (e.g., the chance that a virus corresponding to the new definition went undetected is sufficiently large enough to be concerning), or the virus presents serious repercussions from infection (e.g., file corruption, system failure), the anti-virus engine can determine that a complete scan of all files is required, even if the files have high confidence scores or an incremental scan is scheduled for only changed files.

In light of the present disclosure, it will be appreciated that network storage 140 can be implemented by any type of computer-readable storage medium, including, but not limited to, internal or external hard disk drives (HDD), optical drives (e.g., CD-R, CD-RW, DVD-R, DVD-RW, and the like), flash memory drives (e.g., USB memory sticks and the like), tape drives, removable storage in a robot or standalone drive, and the like. Alternatively, it will also be appreciated that, in light of the present disclosure, virtualization system 100 and network 105 can include other components such as routers, firewalls and the like that are not germane to the discussion of the present disclosure and will not be discussed further herein. It will also be appreciated that other configurations are possible. For example, clients 110(1)-(N) can be directly coupled to VM servers 120(1)-(N) and/or network storage 140(1)-(N), and so on.

The letter N is used to indicate a variable number of devices or components. For example, a variable number of clients, VM servers, and network storage are implemented in the storage system. Although the letter N is used in describing a variable number of instances of each of these different devices and components, a repeated use of the letter N does not necessarily indicate that each device and component has a same number of N instances implemented in the virtualization system.

Figure 2:
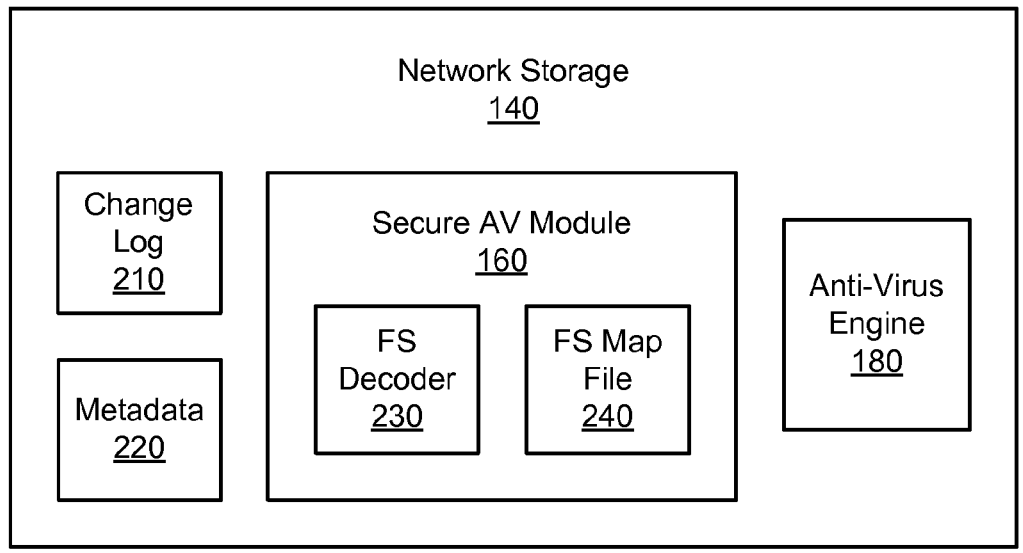
FIG. 2 is a block diagram that illustrates relevant components of a secure AV module, according to one embodiment.

FIG. 2 is a block diagram that illustrates relevant components of a secure AV module, according to one embodiment. Secure AV module 160 cam be configured to communicate with a file system (not shown) of network storage 140 in order to access a change log 210 and metadata 220 that can be maintained by the file system. Secure AV module 160 can also be configured to communicate with an anti-virus engine 180 and FS (file system) decoder 250. FS decoder 250 can be configured to create and/or access an FS map file 230.

Anti-virus engine 180 can be configured to perform a full virus scan or an incremental virus scan of files on network storage 140. A full virus scan can be performed on the files on network storage, while an incremental virus scan can be performed on a subset of the files on network storage. A full virus scan can also include scanning files of a VMDK file, while an incremental virus scan can also include scanning a subset of the files of a VMDK file.

Change log 210 and metadata 220 are maintained by a file system, such as VxFS file system, implemented on network storage 140 as part of the file system's snapshot functionality. A snapshot is a consistent, point-in-time copy of a file system. While snapshot is referred to herein, other point-in-time copies can be used, such as a checkpoint. A change log and metadata track the changes made between snapshots of the file system, which is discussed in further detail in reference to FIG. 5.

FS decoder 230 provides an interpretation of a file system structure for a given VMDK file. A VMDK file for a virtual machine contains a VMDK header and a volume, or single accessible storage area. A file system (e.g., NTFS file system) can be stored on the volume of the VMDK file. The file system can organize the files and data (e.g., OS, applications, and application data) of the virtual machine. FS decoder 230 generates and uses an FS map file 240 to map data block addresses from one file system to another (e.g., from the file system of the VMDK file's volume to the file system of the network storage device in which the VMDK file is stored, or from the network storage file system back to the file system of the VMDK file's volume).

FS decoder functionality can be provided by implementing API functions of a mapping service, such as Symantec™ Mapping Service. A mapping service can be a set of shared libraries that offer data storage management application developers a common set of tools to provide data mapping for their storage management products. A mapping service exposes the private metadata of objects (e.g., files) and the configurations of the storage stack on which those objects reside, and provides a logical to physical data mapping of data objects. FS decoder 250 is discussed in further detail in reference to FIG. 5.

Figure 3:
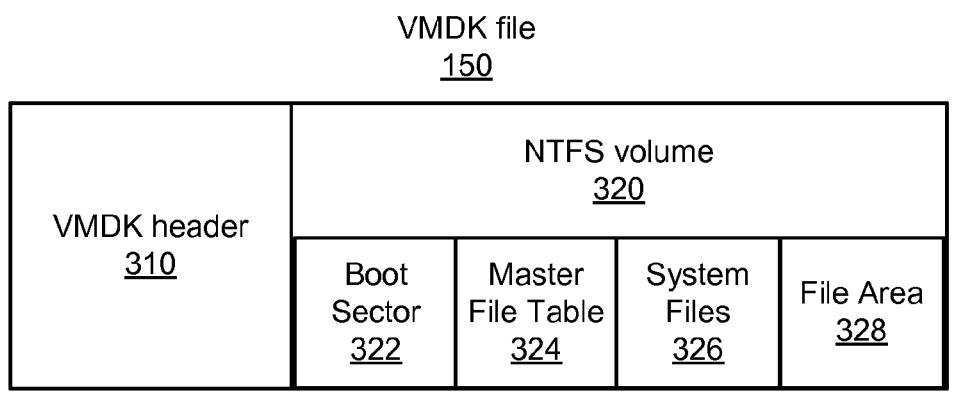
FIG. 3 is a block diagram that illustrates an example software container of a virtual machine, or VMDK file, according to one embodiment.

FIG. 3 is a block diagram that illustrates an example software container of a virtual machine, or VMDK file. In one embodiment, a VMDK file 150 can include a VMDK header 310 and a volume. Each VMDK file (as a virtual machine disk) implements a file system on the volume of the VMDK file. The file system can be responsible for organizing and managing files and folders of the virtual machine. Each file system provides a structure in which files of the virtual machine are stored. This structure can be built within an allocation of disk space, such as an entire disk device, a partition within a disk device, or a volume. In the embodiment shown, a logical disk drive of a virtual machine is stored in a file system on a volume of the VMDK file 150, where the file system (and thus the volume) contains the files and data (e.g., OS files, applications, and application data) of a virtual machine. The volume of the VMDK file that contains a file system is also referred to herein as a file system volume. For example, the volume of the VMDK file that contains an NTFS file system is referred to herein as NTFS volume 320. NTFS volume 320 can also include a boot sector 322, a master file table 324, system files 326, and a file area 328 for storing extents of files, further discussed in reference to FIG. 5.

Since the NTFS volume 320 can be stored in virtual machine disk (VMDK) format, a VMDK header can also be included in the VMDK file. A VMDK header can be reserved for VMDK format and has a fixed size. A VMDK header provides information about the NTFS volume as a virtual machine disk. An NTFS volume begins after the VMDK header. One or more VMDK files can be stored on a network storage device.

Figure 4:
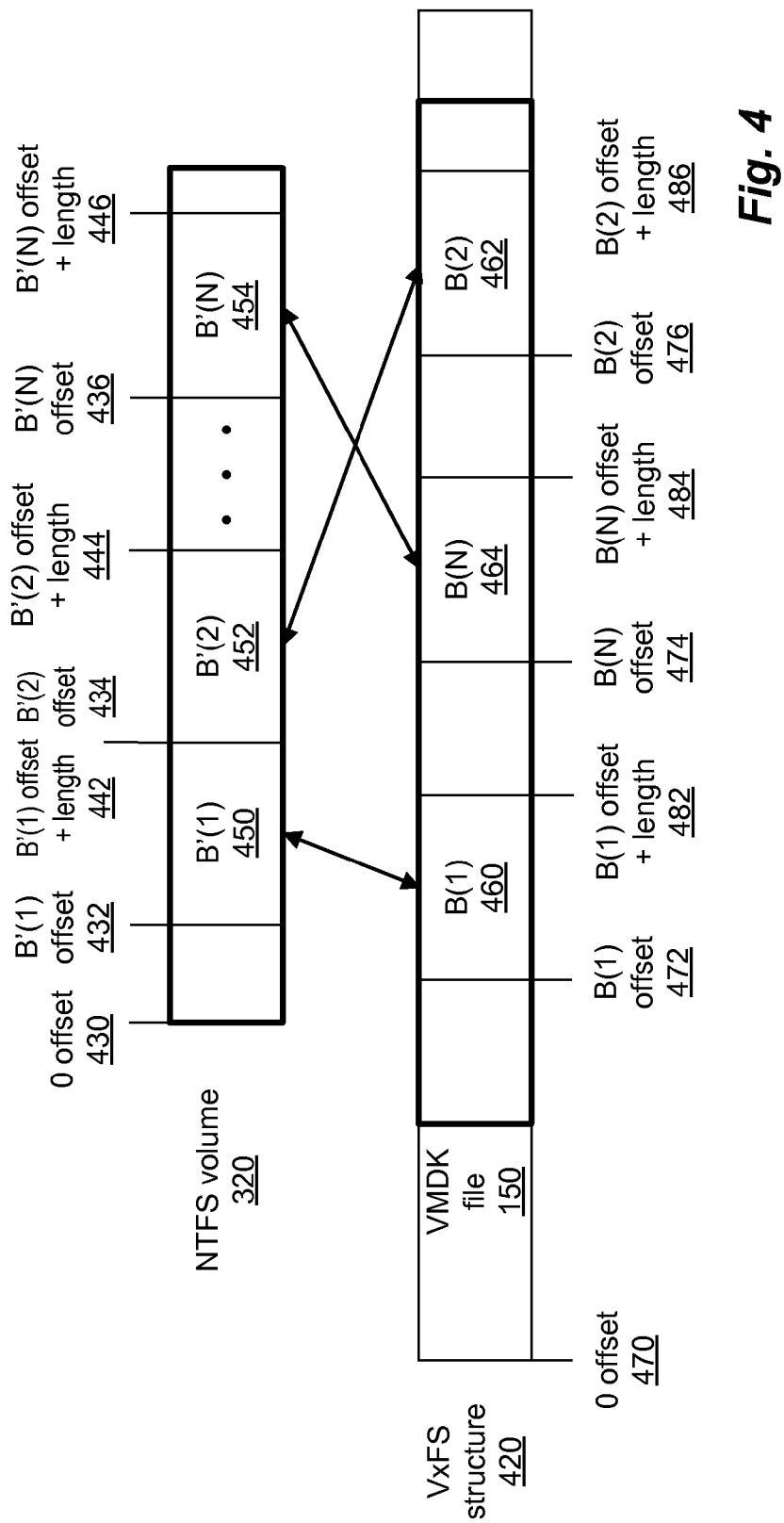
FIG. 4 is a block diagram that illustrates an example representation of data blocks in an NTFS volume of a VMDK file and in a VxFS file system structure of a network storage device, according to one embodiment.

FIG. 4 is a block diagram that illustrates an example representation of data blocks stored in an NTFS volume 320 of a VMDK file 150 and in a VxFS file system structure 420 of network storage 140. VMDK file 150 can include an NTFS volume, or a volume containing a file system that can store files within the volume. Data blocks of the files are located at various locations within the file system volume. The data blocks contained in the NTFS volume (and thus also contained in the VMDK file) can be represented as data blocks B(1)-(N) stored in the VxFS structure 420 and as data blocks B'(1)-(N) stored in the NTFS volume. Data blocks B(1)-(N) can be stored at contiguous or non-contiguous locations in VxFS structure 420. Data blocks B'(1)-(N) can similarly be stored at contiguous or non-contiguous locations in NTFS volume 320.

A data block can have a block address within a file system volume. A block address can be generally defined as an offset plus a length. An offset can be expressed as an ordinal number that indicates the position of the data block, in reference to the file system volume in which the data block is stored. For example, the ordinal number can be a number of bytes that represents the starting point of the data block in relation to the beginning (zero offset) of the file system volume. A length indicates a size that runs from the offset, and can be a number of bytes that are included in the data block. Thus, a block address of offset+length is a volume-relative address.

The offset+length addressing scheme can also be used to identify more than one data block, such as a run of contiguously stored data blocks, also referred to herein as a data run. The offset of the data run can be expressed as an ordinal number that indicates the position of the first block in the data run, in reference to the beginning of the file system volume in which the data run is stored. For example, the ordinal number can be a number of bytes that represents the starting point of the first data block of the data run in relation to the beginning (zero offset) of the file system volume. The length of a data run can similarly be expressed as a number of bytes that are included in the data run, which runs from the offset. In another example, the ordinal number can also be a block number that represents the starting block of the data run, where the block number indicates the position of the starting block in relation to the beginning (zero offset) of the file system volume in which the data run is stored. The length of a data run can similarly be expressed as a number of data blocks included in the data run, which runs from the offset.

Thus, an offset and length address can be used to identify a single data block, a data run (e.g., data blocks contiguously stored in the file system), or an entire file (which can be made up of multiple data blocks). If a file is stored as one or more data runs, each of the data runs of the file can be identified by an offset and length. An offset and its corresponding length is also referred to herein as an address, as offset+length, and as a [offset, length] set.

Since a data block that resides within an NTFS volume also resides on a network storage device, the data block can also have a device-relative block address, in reference to the particular network storage device in which the data block is stored. A device-relative address can be indicated by including a device identifier with the offset and length of the data block or data run. The offset+length of the device-relative address can be volume-relative to the file system implemented on the network storage device.

As shown in FIG. 4, each data block can have a block address in the NTFS volume and a corresponding block address in the VxFS file system. For example, data block represented by B(1) 460 in the VxFS structure 420 can have a B(1) offset 472 and a B(1) offset+length 482. The same data block can also be represented by B'(1) 450 in NTFS volume 320, and can have a B'(1) offset 432 and a B'(1) offset+length 442. The arrow relationships between blocks B(1)-(N) and B'(1)-(N) indicate that B and B' represent the same data block. The offsets and lengths for B(1)-(N) are relative to the VxFS structure 420, while the offsets and lengths for B'(1)-(N) are relative to the NTFS volume 320. While the description of FIG. 4 refers to data block representations B(1)-(N) and B'(1)-(N), B and B' can also represent data runs, where B(1)-(N) can each represent a data run (e.g., a group of contiguous data blocks) in the VxFS structure 420, and B'(1)-(N) can each represent a data run in the NTFS volume 320.

Figure 5:
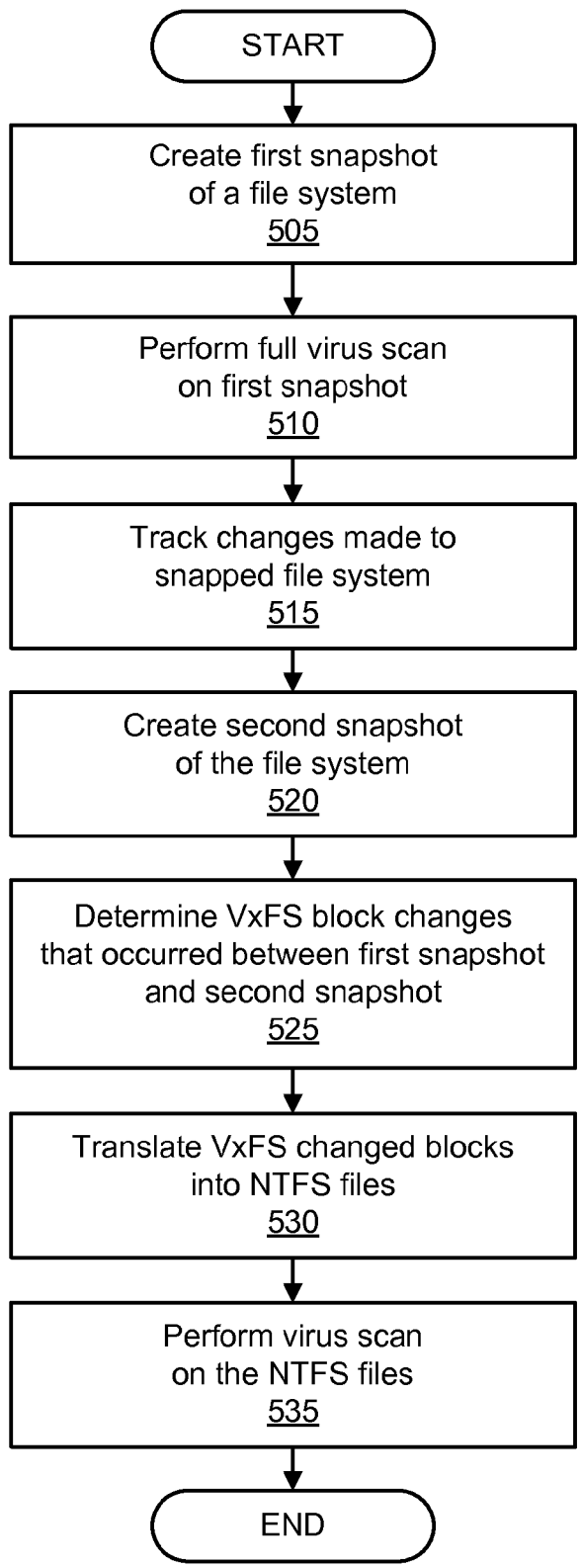
FIG. 5 is a flow chart illustrating relevant acts of an example process implemented by a secure AV module, according to one embodiment.

FIG. 5 is a flow chart illustrating relevant acts of an example process implemented by a secure AV module. The process begins at operation 505, creating a first snapshot of a file system of a network storage device 140. A user can schedule snapshots to be taken of a file system, either via an interface provided by the secure AV module or a command line interface of the network storage device. In both cases, the secure AV module can be made aware of the scheduled snapshots. The secure AV module can also be configured to automatically, without user intervention, schedule the first snapshot. The secure AV can also schedule snapshots to occur periodically, such as every month.

A snapshot provides a consistent point-in-time view of data in a file system, as the data exists at the time the snapshot is created. A snapshot can be created by freezing a file system, or temporarily blocking I/O operations to the file system to avoid any changes from occurring to the file system, and "snapping" the file system to produce a snapshot, or snapshot file system (snapshot FS). When a file system is "snapped," the file system can be referred to as a snapped file system (snapped FS). A snapshot FS can be a logical copy of a snapped FS, and thus appears as an exact image of the snapped FS as the snapped FS existed at the time the snapshot was created. Rather than copying the snapped FS's data blocks into the snapshot FS, the snapshot FS initially can include pointers, or references, that point to the data blocks stored in the snapped FS.

In particular, a file system that contains VMDK files can be snapped to produce a snapshot FS, where the snapshot FS includes references to the VMDK files stored in the snapped FS. Each VMDK file that is referenced by the snapshot FS (or simply snapshot) can be viewed as a backup image of a VMDK file. While the live version of the VMDK file can be updated in the snapped FS, the backup image of the VMDK file that is referenced by the snapshot FS provides a static point-in-time view of the VMDK file as the VMDK file existed at the time the snapshot was taken. A VMDK file that is referenced by a snapshot is referred to herein as being a VMDK file of the snapshot, and is also referred to herein as a backup image of a live VMDK file.

Metadata about the data blocks stored in the snapped FS can be stored in the snapshot FS. In one embodiment, metadata can include a block map and/or a bit map to track changes made to the data blocks stored in the snapped FS. Both a block map and a bit map contain an entry corresponding to each data block of the snapped FS. The block map and bit map entries can be initialized to zero when the snapshot FS is created, indicating that no changes have been made to the blocks stored in the snapped FS. In one embodiment, metadata can include markers that track changes made to the data blocks stored in the snapped FS by indicating which data blocks have changed since the last snapshot (e.g., since the first snapshot). Once a snapshot is created, the snapped file system can be thawed, where I/O operations are no longer blocked.

The process of FIG. 5 proceeds to operation 510, performing a full virus scan of the first snapshot. A user can request that the full virus scan be performed by an anti-virus engine, either via an interface provided by the secure AV module or an interface of the anti-virus engine. In both cases, the secure AV module can be made aware of the virus scan. The secure AV module can also be configured to schedule the full virus scan automatically, without user intervention. The full virus scan can be scheduled to occur at a time after the first snapshot is created. The secure AV can also schedule the full virus scan to occur periodically, such as every month.

An anti-virus engine 180 can perform a virus scan of a snapshot FS by scanning each file of the snapshot. Since a snapshot points to data blocks (and thus to files) in the snapped FS, the anti-virus engine scans the file as the file existed at the time the snapshot was created. Anti-virus engine 180 can examine each file of the file system and search for known virus definitions, or patterns of data, within the file. In one embodiment, a signature can be calculated for a file, and then compared with known virus definitions to determine if the file is infected or not. The anti-virus engine is unaware that a file being scanned is a live (changing) version of the file in the original (snapped) FS or an older version of the file referenced by the snapshot FS. The anti-virus engine can also scan VMDK files referenced by the snapshot FS. In order to scan a VMDK file, the anti-virus engine needs to scan the individual files within the VMDK file (i.e., the files stored in the NTFS volume within the VMDK file). Since the VxFS file system may be unaware of the NTFS files (e.g., OS files, applications, application data, and the like) contained within the VMDK file, the NTFS files (which have NTFS file addresses, or file addresses relative to the NTFS volume) are translated into VxFS files (which have VxFS file addresses, or file addresses relative to the VxFS file system) and provided to anti-virus engine by FS decoder.

FS decoder provides an interpretation of the NTFS file system structure for a given VMDK file. An NTFS volume can include a master file table (MFT), which stores information about every file and folder on the NTFS volume. Since a folder can be a special kind of file, references made herein to files also include folders. When a file is created on the NTFS volume (e.g., added to the NTFS file system and thus stored within the volume of the VMDK file), a record for the file can be created in the MFT. Each file can be implemented as a collection of attributes, which can be resident attributes (i.e., attributes stored within the MFT file record) or non-resident attributes (i.e., attributes not stored within the MFT file record). Example resident file attributes include the name of the file and a time of the file's creation.

If the file is small enough to fit within the MFT file record, the data of the file can be stored as a resident attribute within the MFT file record itself. If the file cannot fit within the MFT file record, the data of the file can be stored as a non-resident attribute outside of the MFT file record. The data of the file can be stored in file area reserved for file data. The file data can be stored as a data run, or run of data blocks. A pointer can be placed in the MFT file record that points to the location of the non-resident attribute (e.g., file data stored in file area 328). The pointer can include a reference to the start of the data run (i.e., an offset) and a size of the data run (i.e., a length). Since file data can be stored in multiple data runs in the NTFS volume, multiple pointers can be placed in the MFT file record, each pointing to a data run of the file data. Thus, a file can be identified as one or more [offset, length] sets. FS decoder can read the file records in the MFT, as well as other data from the VMDK file (e.g., NTFS headers, metadata, and data extents), and can construct a full NTFS file system tree of the NTFS volume. FS decoder (via a mapping service API) can return an NTFS file address (e.g., one or more [filename, offset, length] sets) for each file in the NTFS volume, as the FS decoder walks through the NTFS file system tree.

FS decoder can translate an NTFS file address into a VxFS file address using an FS (file system) mapping. The FS mapping, stored as a FS map file, provides a topology mapping of data blocks through intermediate layers like logical volumes down to actual physical devices, and can correlate addresses of different file systems. An example mapping is shown in FIG. 4, which indicates the relationships between file system addresses. An FS mapping can be created by using the mapping service (e.g., implementing mapping service APIs in the FS decoder) to obtain physical addresses corresponding to VxFS block addresses of data blocks stored in the VxFS file structure and to obtain physical addresses corresponding to NTFS block addresses of data blocks stored in the NTFS volume. The physical addresses can be used to create a FS mapping by correlating block addresses of the VxFS and NTFS file systems that are associated with the same physical address. Thus, each VxFS block address (e.g., block number and/or byte number) can have a corresponding NTFS block address. Since a file can be composed of data blocks, FS decoder can use the FS mapping to translate the NTFS file address into the equivalent VxFS file address (e.g., translate the NTFS block address of the first block of the file into a corresponding VxFS block address, and translate the associated NTFS length into a corresponding VxFS length). FS decoder can provide the VxFS file addresses of the NTFS files to the anti-virus engine (e.g., as one or more VxFS [offset, length] sets).

Once the VxFS file addresses of the NTFS files are provided to the anti-virus engine, the anti-virus can perform decomposition of the NTFS files. An NTFS file can be a complex file that contains embedded documents, such as text files, graphics files (e.g., JPEG and GIF files), media files (e.g., MPEG and AVI files), sound files (e.g., MP3 and MIDI files), and the like. As discussed above, the anti-virus engine can decompose a complex file by breaking the file down into file components. Anti-virus engine can then scan the decomposed file components of the NTFS files, and thus scan the files of the VMDK file. Anti-virus engine can scan all VMDK files referenced in the first snapshot in this fashion.

The process of FIG. 5 proceeds to operation 515, tracking changes made to the snapped FS. Although operation 515 is shown as occurring after operation 510, operation 515 can immediately and continuously occur after operation 505 is complete. After the first snapshot is created, any changes made to data in the snapped FS can be tracked by the snapshot FS in a change log associated with the first snapshot. A change operation (e.g., write, rename, create, or delete operation) can be recorded in an entry of the change log, along with an identification of the data (e.g., file address and/or block address) that was changed by the change operation. Changes can be tracked and added to the change log associated with the first snapshot, until a next snapshot is created.

Changes can also be tracked in the metadata of the snapshot FS. As changes are made to the data stored in the snapped FS, the metadata of the snapshot FS can be updated to reflect the changes made since the snapshot was created. For example, a copy-on-write technique can be used to implement changes in the snapped FS. When a change operation for one or more data blocks is received, the snapshot FS will first copy the original data block(s) of the snapped FS to another location (e.g., to storage reserved for the snapshot), and then perform the change operation on the data block(s) stored in the snapped FS. The bit map entry corresponding to a changed data block can be changed from zero to one, to indicate that the content of this data block can now be found at a different location (e.g., in the snapshot FS), and thus indicates that this data block of the snapped FS has changed. The snapshot block map entry corresponding to a changed data block can also be updated to indicate the data block has changed (e.g., the block map entry can be updated to include the block number of the new data block, which contains the original content of the data block). In another example, markers of the snapshot FS can point to or reference the data block(s) in the snapped file system, indicating which data block(s) have changed since the snapshot was created.

In particular, changes made to (live) VMDK files stored in a file system on network storage are tracked after a snapshot is created of the file system. For example, if a VMDK file has been downloaded to and installed on a VM server, changes can be made to data of a virtual machine booted from the running VMDK file on the VM server (e.g., a user can access an application of the running virtual machine and change data stored within the running VMDK file). These changes can be updated to the corresponding (live) VMDK file stored in the file system on the network storage. The changes made to the live VMDK file are tracked in the change log and metadata associated with the snapshot. A shutdown VMDK file, or a VMDK file that is not presently running on a VM server, does not experience any changes, and thus the data of the live VMDK file will not be updated.

The process of FIG. 5 proceeds to operation 520, creating a second snapshot of the file system. A user can schedule a second snapshot to be taken of a file system, either via an interface provided by the secure AV module or a command line interface of the network storage device. In both cases, the secure AV module can be made aware of the scheduled snapshots. The secure AV module can also be configured to automatically, without user intervention, schedule a second snapshot. The secure AV can also schedule snapshots to occur periodically, such as every month.

To create a next snapshot, the changes tracked in the change log and metadata associated with the previous (or first) snapshot can be committed, or made permanent, to the original file system of the network storage device. Once the changes are committed to the original file system, the file system can again be frozen and snapped to create a second snapshot. In another embodiment, the changes are not committed before creating a second snapshot, where changes to data of a file can be stored in multiple change logs associated with multiple snapshots. Once the second snapshot is created, the snapped file system can be thawed. Any changes made to data of the snapped file system are tracked in a change log and metadata associated with the second snapshot. Changes are tracked until a following snapshot is created.

The process of FIG. 5 proceeds to operation 525, determining VxFS block changes that occurred between the first snapshot and the second snapshot. The change log maintained by VxFS contains the changes that have been tracked between the first snapshot and the second snapshot in the VxFS file system. The change log can include change entries that each indicate a change operation (e.g., a write operation) and an identification of the data (e.g., file address and/or block address) that are changed by the change operation. By determining the changes made to particular data, a virus scan can be performed that covers the files including the changed data, rather than performing a full scan of the second snapshot, which saves time and resources.

Since the change log can be maintained by the snapshot FS, which can be a VxFS file system, the information stored in the change log reflects the VxFS format. For example, the change log can identify changed data blocks as an offset and length (or multiple [offset, length] sets) relative to the VxFS file structure. The change log can also identify the changed data blocks as a file (e.g., file address), as the file is known in the VxFS file structure. For example, if a change operation changed data of a particular VMDK file, the change log may identify the VMDK file (since the VxFS may be unaware of the various other files contained within the VMDK file). However, performing a virus scan on the entire particular VMDK file can still be time-consuming, especially considering that many of the files in the VMDK file may not have changed since the last scan (e.g., when the first snapshot was taken). Thus, to further save time and resources, the changed files within the VMDK file can be identified and scanned, rather than scanning all files of the VMDK file.

If the change log identifies a VMDK file of the snapshot (i.e., a backup image of a VMDK file), one or more block addresses of the particular changed blocks in the VMDK file can be determined using metadata describing the changed data blocks, such as a block map and/or bit map associated with the snapshot. For example, entries of the bit map that correspond to the data blocks of the particular VMDK file indicate which data blocks of the particular VMDK file have been changed. Markers can also be used to identify changed data blocks of the VMDK file. Once the changed data blocks are identified, a block address of the changed data blocks (e.g., one or more [offset, length] sets) can be retrieved from the block map and recorded in a temporary list. Since the changed blocks are tracked in the VxFS file system, the retrieved block addresses of the changed data blocks are relative to the VxFS file system.

The process of FIG. 5 proceeds to operation 530, translating VxFS changed data blocks into NTFS files. As discussed above, FS decoder can use an FS mapping, or map file, to translate addresses of one file system into addresses of another file system. Since anti-virus engine cannot scan on the block level, but instead scans on the file level, FS decoder can use the VxFS block addresses of the changed blocks to determine the NTFS files that contain the changed data blocks. For example, FS decoder can use the VxFS block address to lookup the equivalent NTFS block address in the FS map file (e.g., a VxFS offset or block number can be used to lookup the corresponding NTFS offset or block number, and a VxFS length or ending block number can be used to lookup the corresponding NTFS length or ending block number). Once the NTFS block address is determined, FS decoder walks through the MFT file records and determines if one of the NTFS files contains the NTFS changed block (e.g., the NTFS block address falls within or overlaps an NTFS file address). FS decoder returns the NTFS files that contain the changed data blocks, which are the changed NTFS files.

Once FS decoder has determined the changed NTFS files (which need to be scanned), FS decoder can once again translate the NTFS addresses of the changed NTFS files into corresponding VxFS addresses, using the FS map file. FS decoder then returns the VxFS file addresses of the changed NTFS files to the anti-virus engine (e.g., as one or more sets of VxFS offset+length). This translation process is further discussed in reference to FIGS. 6 and 7.

The process of FIG. 5 proceeds to operation 535, performing virus scan on the particular NTFS files. Once FS decoder provides the VxFS addresses of the changed NTFS files to the anti-virus engine, the anti-virus can perform a scan of the changed NTFS files, including decomposing the files, as discussed above. Thus, a secure AV module coordinates communication between a file system on network storage, an FS decoder, and an anti-virus engine to perform an incremental virus scan on files contained in a VMDK file of the snapshot (i.e., a backup image of a VMDK file), without having to perform a full virus scan of the entire VMDK file or of the entire snapshot in which the VMDK file is referenced.

Figure 6:
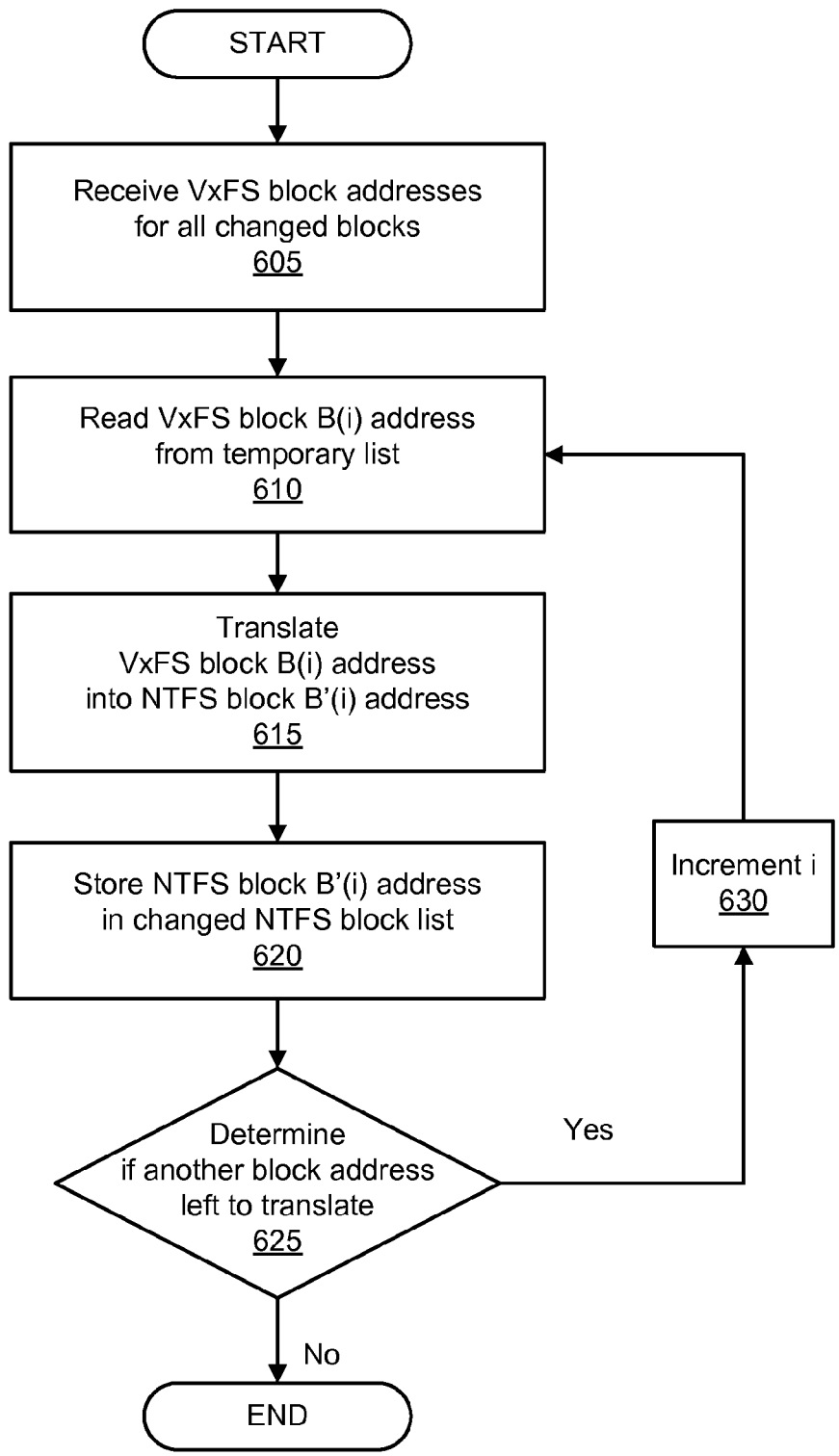
FIG. 6 is a flow chart illustrating relevant acts of an example process implemented by an FS decoder, according to one embodiment.

FIG. 6 is a flow chart illustrating relevant acts of an example process implemented by an FS decoder. The process of FIG. 6 begins at operation 605, receiving VxFS block addresses for all changed blocks of a VMDK file. The FS decoder receives the block addresses from the secure AV module, where the block addresses of the changed blocks and an identification of the VMDK file can be recorded in a temporary list. As discussed above, the secure AV module determines the changed blocks from the metadata maintained by the VxFS file system (e.g., bit map, block map, markers, and change log). Since the block addresses recorded in the temporary list are associated with a single VMDK file, the process of FIG. 6 can be repeated for each VMDK file of the snapshot FS (e.g., the FS decoder can receive multiple temporary lists, each associated with a different VMDK file). In another embodiment, the FS decoder can receive VxFS block addresses for changed blocks of multiple VMDK files, where the block addresses are recorded in a single temporary list. Block addresses recorded in the temporary list are also associated with an identification of the VMDK file in which the block addresses can be found.

The process of FIG. 6 proceeds to operation 610, reading VxFS block B(i) address from the temporary list. Operation 610 begins a reiterative loop that will walk through and translate each block address in the temporary list. Thus, operations 610-625 are repeated (or reiterated) for each block address in the temporary list. A present iteration of the loop is indicated by the letter i, which can be initialized to one when the temporary list is received (i.e., when the reiterative loop begins). A first iteration of operation 610 thus reads the block address of the first block B(1) from the temporary list. At the end of each iteration, the letter i is incremented (e.g., operation 630), indicating that the next block address in the list can be read (if there is another block address to be read).

The process of FIG. 6 proceeds to operation 615, translating a VxFS block B(i) address into an NTFS block B'(i) address. As discussed above, FS decoder uses the VxFS block B(i) address to look up an associated NTFS B'(i) block address in the FS map file. For example, a VxFS offset (e.g., block number and/or byte number) can be used to lookup the corresponding NTFS offset (e.g., block number and/or byte number), and a VxFS length (e.g., an ending block number and/or byte number) can be used to lookup the corresponding NTFS length (e.g., an ending block number and/or byte number). Once the NTFS block B'(i) address is determined, the process of FIG. 6 proceeds to operation 620, storing the NTFS block B'(i) address in a changed NTFS block list. Thus, FS decoder collects the translated NTFS block addresses, which can be used to determine which NTFS files have been changed.

The process of FIG. 6 proceeds to operation 625, determining if another block address is left in the temporary list to translate. If another block address is left, the process proceeds to operation 630, incrementing i, and returns to operation 610 to begin a new iteration for the next block address. If another block address is not left (i.e., all block addresses in the temporary list have been translated), the process ends.

Figure 7:
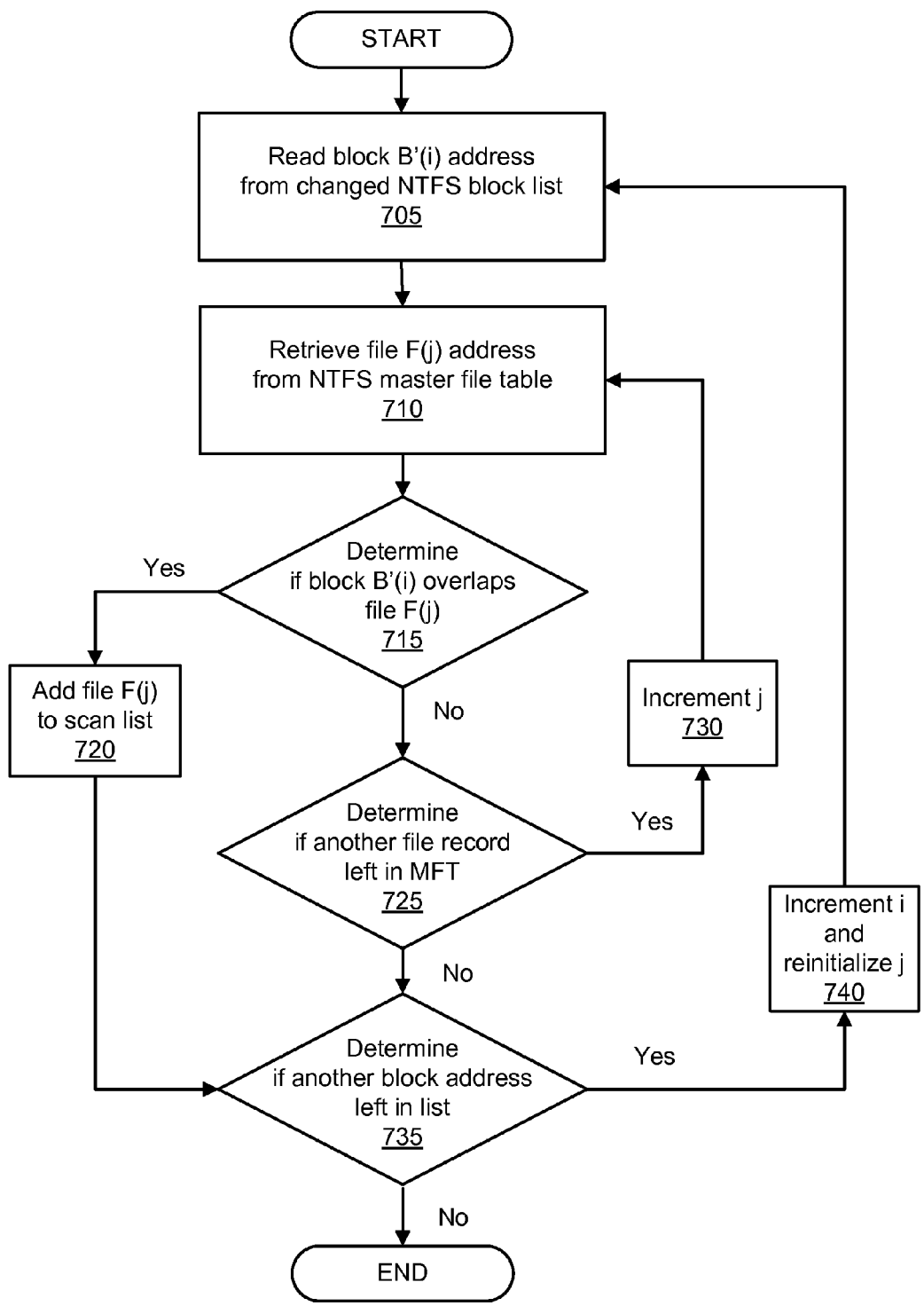
FIG. 7 is a flow chart illustrating relevant acts of an example process implemented by an FS decoder, according to one embodiment.

FIG. 7 is a flow chart illustrating relevant acts of an example process implemented by an FS decoder. The process of FIG. 7 begins at operation 705, reading a block B'(i) address from the changed NTFS block list (i.e., the translated NTFS block addresses of changed data blocks). Since the block addresses recorded in the changed NTFS block list can be associated with a single VMDK file, the process of FIG. 7 can be repeated for each VMDK file of the snapshot FS (e.g., the FS decoder can receive multiple NTFS block lists, each associated with a different VMDK file). In another embodiment, the FS decoder can receive NTFS block addresses for changed blocks of multiple VMDK files, where the block addresses are recorded in a single NTFS block list. Block addresses recorded in the NTFS block list are also associated with an identification of the VMDK file in which the block addresses can be found.

Operation 705 begins a reiterative loop that will walk through each block address in the changed NTFS block list and determine which NTFS files contains the changed blocks. Thus, operations 705-735 are repeated (or reiterated) for each block address in the changed NTFS block list. A present iteration of the loop is indicated by the letter i, which can be initialized to one when the changed NTFS block list is received (i.e., when the reiterative loop begins). A first iteration of operation 705 thus reads the block address of the first block B' (1) from the changed NTFS block list. At the end of each iteration, the letter i is incremented (e.g., operation 740), indicating that the next block address in the changed NTFS block list can be read (if there is another block address to be read).

The process of FIG. 7 proceeds to operation 710, retrieving file F(j) address from the NTFS master file table. As discussed above, each file has an MFT file record, which contains an address of the file. Operation 710 begins a second reiterative loop that will walk through each file record of the MFT and determine if block B(i) is contained in the file of the file record. A present iteration of the second loop is indicated by the letter j, which can be initialized to one when the FS decoder begins walking through the MFT (i.e., when the second loop begins). A first iteration of operation 710 thus retrieves a file address from the first MFT file record. At the end of each iteration, the letter j is incremented (e.g., operation 730), indicating that a next file address can be retrieved from the next MFT file record (if there is another file record left in the MFT to be retrieved).

The process of FIG. 7 proceeds to operation 715, determining if block B'(i) overlaps file F(j). For each MFT file record, FS decoder determines the address of a file F(j). FS decoder then determines if the block address overlaps the file address, such as by determining if the [offset, length] of the changed block B'(i) overlaps any block within the [offset, length] of the file F(j). If the changed block overlaps with the file (i.e., the file contains the changed data block), the process proceeds to operation 720, adding file F(j) to the scan list. Information about file F(j) can be added to the scan list, such as a [filename, offset, length] set of the file F(j). Since the scan list can include NTFS file information, the file addresses in the scan list can be translated back into VxFS addresses, once the process of FIG. 7 is complete. Such translation can be performed using a process similar to the process of FIG. 6, where FS decoder can read a NTFS file address from the scan list and translate it into a VxFS file address. The translated scan list can then be provided to anti-virus engine to perform a scan of the files in the scan list. Thus, FS decoder provides a translated scan list to anti-virus engine, enabling the anti-virus engine to perform an optimized incremental virus scan on the changed NTFS files in the VMDK file.

Returning to operation 715, if the changed block(s) does not overlap, the process proceeds to operation 725, determining if another file record is left in the MFT. If another file record is left in the MFT, the process proceeds to operation 730, incrementing j, and returns to operation 710 to retrieve a next file F(j) address from the next file record in the MFT.

From operation 725, if another file record is not left in the MFT (i.e., all file records in the MFT have been walked through), the process proceeds to operation 735, determining if another block address is left in the changed NTFS block list. If another block address is left in the list, the process proceeds to operation 740, incrementing i, and then returns to operation 705 to begin a new iteration for the next block address. Operation 740 also reinitializes j to one, indicating the FS decoder will again walk through the MFT file records from the beginning of the MFT in order to match the next block address with another NTFS file. If another block address is not left in the list (i.e., all block addresses in the NTFS changed block list have been matched to an NTFS file), the process ends. The translated scan list can then be provided to anti-virus engine to perform a scan of the files in the scan list. Thus, FS decoder provides a translated scan list to anti-virus engine, enabling the anti-virus engine to perform an optimized incremental virus scan on the changed NTFS files in the VMDK file.

The solution provided in FIG. 7 can be an $O(n*m)$ algorithm, with m files in the NTFS file system and n number of changed blocks, and can possibly be an $O(\log m)$ algorithm. Another solution for determining NTFS file addresses can use a binary search tree for addresses to achieve time savings. As the FS decoder walks through the NTFS file system tree, the FS decoder can populate a binary search tree with file addresses of the NTFS files (e.g., as nodes of the tree). The FS decoder can then use the binary search tree to find files that contain a changed data block. Rather than comparing a block address with each file address in an MFT, the FS decoder can use the block address to perform a search in the binary search tree (e.g., traverse the tree) to quickly and efficiently locate a corresponding file address (e.g., a range of block addresses in which the block address falls), and thus locate a file that contains the changed block. For example, the block address can be compared to the address of the root node of the tree. FS decoder can determine whether the block address (or value of the block address) is greater than or less than the root node address (or value of the address in the root node). If greater than, the search continues to the right subtree. If less than, the search continues to the left subtree. The search reiterates through the subtrees (comparing the block address to the next node of the subtree and determining the block address is greater than or less than the address of the next node) until a file address is found that contains the block address.

Another solution for determining NTFS files can use a binary map (e.g., a binary search tree for file addresses), which is essentially O(constant), at least within a space of a few trillion blocks. A binary map achieves a magnifying effect. A binary map has two regions: a management region, or the binary map, and the arena, or the actual object that the binary map manages (i.e., the files of the NTFS file system). The management region and the arena are related by a mapping or magnification factor. Each bit in the binary map maps to some number of bytes in the arena. Each bit in the arena corresponds to a block address of each block stored in the NTFS file system, where a number of bytes in the arena correspond to a number of data blocks of the NTFS file system. The binary map itself can be a congruous array of these elements, which is like a scaled down version of the arena. During a search for a block address, the binary map can indicate a range of block addresses in which a block address falls. Thus, the binary map provides a quick solution to locate which files of an NTFS volume contain changed data blocks, allowing secure AV module to quickly locate and return file addresses of the NTFS files containing the changed blocks, rather than iterating through each file record of the MFT and comparing a block address with a file address of an MFT record.

For example, bits can be grouped together into 64 byte "groups," yielding 512 contiguous bits per group. A subrange can be an array of pointers to bit groups. A range can be an array of pointers to subranges, with a header indicating the specific range. Range, subrange, and big group pages are allocated in the same 64K sized pages. A range, subrange, and bit group, if fully populated, can store 32 GiBits. Thus, a binary map library can be a simple three-level scheme where 64-byte groups of bits are arranged within arrays of pointers, or, essentially a three level deep array whose pieces are allocated dynamically.

A secure AV module can access the management region of the binary map and determine which files contain a changed block by traversing through the pointer arrays of the management region down to the arena (where each bit of the arena represents a block address). Each group of bits (and/or subrange and/or range) can represent a file address, or range of block addresses, where each bit of the group of bits represent the block addresses of the blocks contained in the file. Secure AV module can determine if a block is contained in a file by traversing pointers of the range, subrange, and group of bits (or similar nested array scheme) to the arena bit corresponding to the block. For example, a range can represent a section of the arena (where a range thus represents a section of the NTFS file system). A range can have various pointers that point to corresponding subranges that represent a subsection of the corresponding section of the arena (where a subrange thus represents a subsection of the section of the NTFS file system). A subrange can have various pointers that point to corresponding groups of bits that represent a number of bits in the arena (where a group of bits thus represents a group of blocks or a file). A secure AV module can determine whether a given block address falls within a file address by searching for a block address in the binary map. The secure AV module can traverse the range and subrange pointers down to the groups that represent a file address, or range of block addresses. If the block address falls within a particular range of block addresses (which is represented by a particular group of bits), the block is determined to be contained in the file represented by the particular group of bits. Thus, secure AV module can avoid iterating through the file records of the MFT to locate NTFS file addresses and comparing a block address with a file address by instead traversing the pointers of the binary map.

A binary map can also be used as another solution for determining the changed blocks in a snapshot. In this case, the binary map manages the blocks of the VxFS file system. Each bit in the arena corresponds to a block of the blocks stored in the snapped (VxFS) file system, where a number of bytes in the arena correspond to a number of data blocks of the snapped file system. As blocks in the snapped file system change, the bits in the arena corresponding to the blocks can also be updated to indicate that the block has changed (e.g., setting the bit corresponding to the block to one), and a bit in the binary map corresponding to the section in which the arena bit is located can also be updated (e.g., setting the bit to one). Thus, the binary map bit corresponding to the section can be set to one on the first block change, and does not need to be changed for subsequent block changes that correspond to bits of the same section. The bits of the management region indicate whether a section of the arena is being used (i.e., whether blocks corresponding to the section of the arena have been changed). Thus, the management region provides a quick overview of which sections of a snapshot contain changed data blocks, allowing secure AV module to quickly locate and return block addresses of the changed blocks of the snapshot, rather than iterating through each entry of the snapshot's bit map to locate the changed blocks.

A secure AV module can access the management region of the binary map and determine which sections of the arena are being used by traversing through the pointer arrays of the management region down to the arena. Secure AV module can traverse pointers of the range, subrange, and group of bits (or similar nested array scheme) to the arena by following the trail of set bits and corresponding pointers in the range, subrange, and group of arena bits. For example, a set bit in the range indicates a pointer that references a subrange, where a set bit in the subrange indicates a pointer that references a group of arena bits, where a set bit in the arena indicates a corresponding changed data block. As data blocks change, the arena bit corresponding to the changed blocks, as well as the group, subrange, and range bits that correspond to the arena bit, are updated to one (and thus reflect the changed block). Thus, secure AV module can avoid iterating through sections of the binary map that do not indicate any changed blocks by instead traversing the pointers of the binary map that are associated with set bits.

Figure 8:
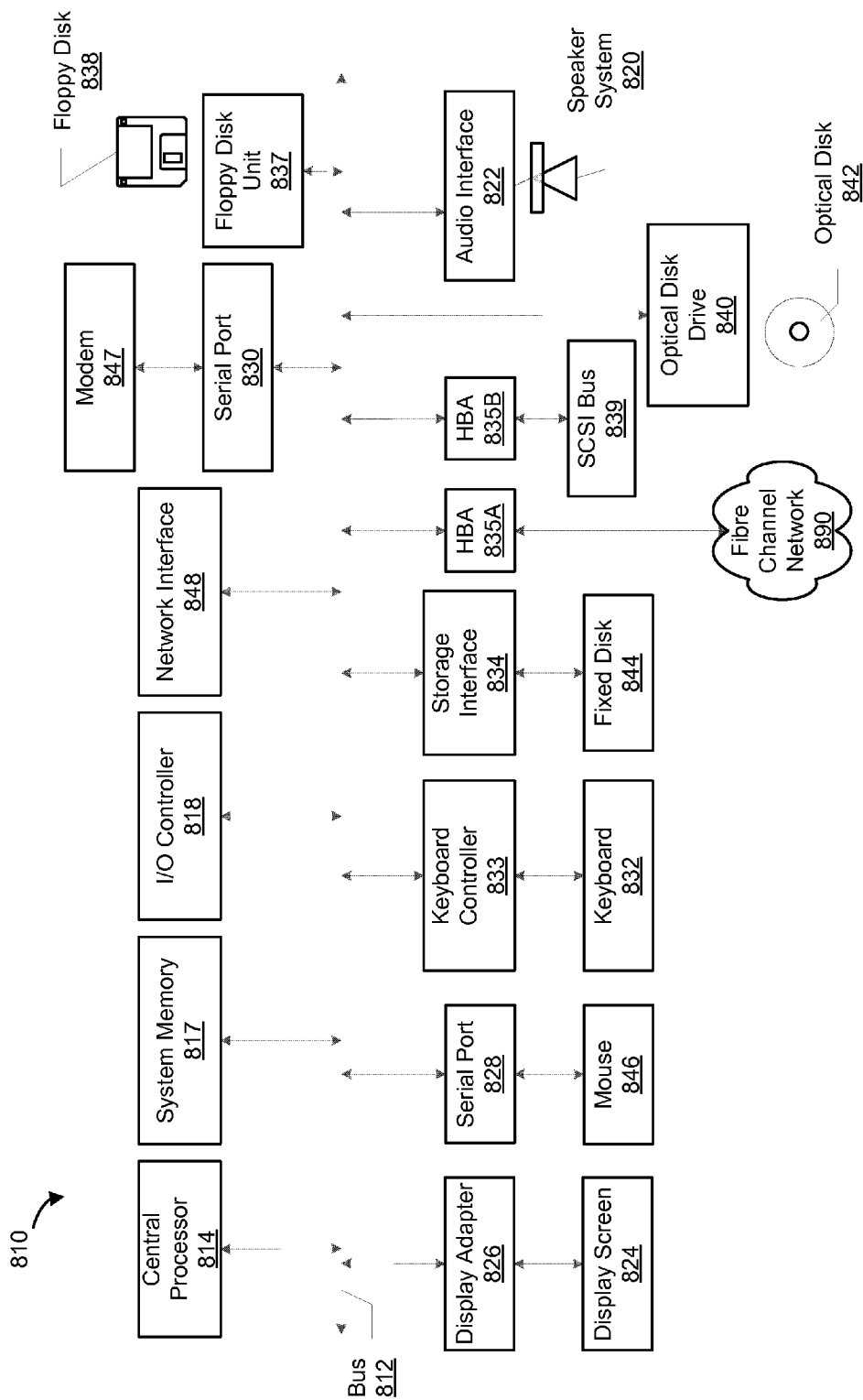
FIG. 8 is a block diagram illustrating relevant components of an example computer system suitable for implementing embodiments of the present application.

FIG. 8 is a block diagram that illustrates an example of a computer system 810 that is suitable for implementing the present disclosure. Computer system 810 may be illustrative of various computer systems in the virtualization system 100, such as system(s) 110, 120, and/or 140, among others. Computer system 810 includes a bus 812 which interconnects major subsystems of computer system 810, such as a central processor 814, a system memory 817 (typically RAM, but which may also include ROM, flash RAM, or the like), an input/output controller 818, an external audio device, such as a speaker system 820 via an audio output interface 822, an external device, such as a display screen 824 via display adapter 826, serial ports 828 and 830, a keyboard 832 (interfaced with a keyboard controller 833), a storage interface 834, a floppy disk drive 837 operative to receive a floppy disk 838, a host bus adapter (HBA) interface card 835A operative to connect with a Fibre Channel network 890, a host bus adapter (HBA) interface card 835B operative to connect to a SCSI bus 839, and an optical disk drive 840 operative to receive an optical disk 842. Also included are a mouse 846 (or other point-and-click device, coupled to bus 812 via serial port 828), a modem 847 (coupled to bus 812 via serial port 830), and a network interface 848 (coupled directly to bus 812).

Bus 812 allows data communication between central processor 814 and system memory 817, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 810 are generally stored on and accessed via a computer readable medium, such as a hard disk drive (e.g., fixed disk 844), an optical drive (e.g., optical drive 840), a floppy disk unit 837, or other storage medium. Additionally, applications can be in the form of electronic signals modulated in accordance with the application and data communication technology when accessed via network modem 847 or interface 848.

Storage interface 834, as with the other storage interfaces of computer system 810, can connect to a standard computer readable medium for storage and/or retrieval of information, such as a fixed disk drive 844. Fixed disk drive 844 may be a part of computer system 810 or may be separate and accessed through other interface systems. Modem 847 may provide a direct connection to a remote server via a telephone link or to the Internet via an internet service provider (ISP). Network interface 848 may provide a direct connection to a remote server via a direct network link to the Internet via a POP (point of presence). Network interface 848 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 8 need not be present to practice the present disclosure. The devices and subsystems can be interconnected in different ways from that shown in FIG. 8. Code for the automatically performing operations on such applications based on their dependencies on other applications (such as described above with reference to the process of FIG. 5-7), etc., to implement the present disclosure can be stored in computer-readable storage media such as one or more of system memory 817, fixed disk 844, optical disk 842, or floppy disk 838. Memory 817 is also used for storing temporary variables or other intermediate information during the execution of instructions by the processor 814. The operating system provided on computer system 810 may be MS-DOS®, MS-WINDOWS®, OS/2®, UNIX®, Linux®, or another known operating system.

Moreover, regarding the signals described herein, it will be understood that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 9:
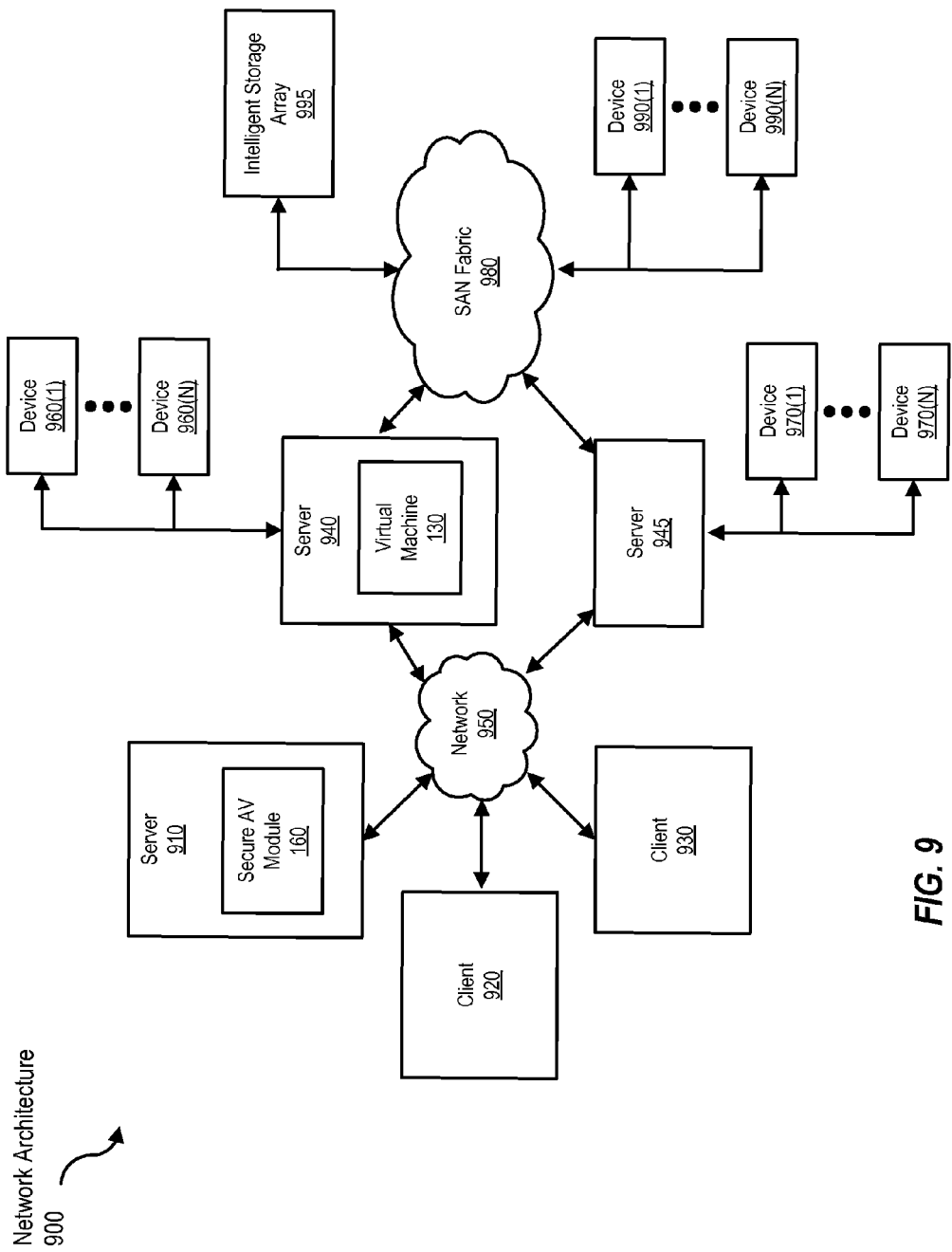
FIG. 9 is a block diagram illustrating relevant components of an example computer system suitable for implementing embodiments of the present application.

FIG. 9 is a block diagram of a network system 900 in which client systems 920 and 930 and servers 910, 940, and 945 can be coupled to a network 950. Client systems 920 and 930 generally represent any type or form of computing device or system, such as client systems 110 in FIG. 1 or computer system 810 in FIG. 8.

Similarly, servers 910, 940, and 945 generally represent computing devices or systems, such as application servers or database servers, configured to provide various database services and/or run certain software applications, such as servers 120 and 150 in FIG. 1 or computer system 810 in FIG. 8. Network 950 generally represents any telecommunication or computer network including, for example, an intranet, a wide area network (WAN), a local area network (LAN), a personal area network (PAN), or the Internet. In one example, client systems 920 and/or 930 and/or servers 910, 940, and/or 945 can include a secure AV module 160, as shown in FIGS. 1 and 2, and/or a virtual machine 130, as shown in FIG. 1.

As illustrated in FIG. 9, one or more storage devices 960(1)-(N) can be directly attached to server 940. Similarly, one or more storage devices 970(1)-(N) can be directly attached to server 945. Storage devices 960(1)-(N) and storage devices 970(1)-(N) generally represent any type or form of storage device or medium capable of storing data and/or other computer-readable instructions. In certain embodiments, storage devices 960(1)-(N) and storage devices 970(1)-(N) can represent network-attached storage (NAS) devices configured to communicate with servers 940 and 945 using various protocols, such as Network File System (NFS), Server Message Block (SMB), or Common Internet File System (CIFS).

Servers 940 and 945 can also be connected to a storage area network (SAN) fabric 980. SAN fabric 980 generally represents any type or form of computer network or architecture capable of facilitating communication between multiple storage devices. SAN fabric 980 can facilitate communication between servers 940 and 945 and a plurality of storage devices 990(1)-(N) and/or an intelligent storage array 995. SAN fabric 980 can also facilitate, via network 950 and servers 940 and 945, communication between client systems 910, 920, and 930 and storage devices 990(1)-(N) and/or intelligent storage array 995 in such a manner that devices 990(1)-(N) and array 995 appear as locally attached devices to client systems 910, 920, and 930. As with storage devices 960(1)-(N) and storage devices 970(1)-(N), storage devices 990(1)-(N) and intelligent storage array 995 generally represent any type or form of storage device or medium capable of storing data and/or other computer-readable instructions.

In certain embodiments, and with reference to computer system 810 of FIG. 8, a communication interface can be used to provide connectivity between each client system 920 and 930 and network 950. Client systems 920 and 930 can be able to access information on server 910, 940 or 945 using, for example, a web browser or other client software. Such software can allow client systems 920 and 930 to access data hosted by server 910, server 940, server 945, storage devices 960(1)-(N), storage devices 970(1)-(N), storage devices 990 (1)-(N), or intelligent storage array 995. Although FIG. 9 depicts the use of a network (such as the Internet) for exchanging data, the embodiments described and/or illustrated herein are not limited to the Internet or any particular network-based environment.

In at least one embodiment, all or a portion of one or more of the embodiments disclosed herein can be encoded as a computer program and loaded onto and executed by server 910, server 940, server 945, storage devices 960(1)-(N), storage devices 970(1)-(N), storage devices 990(1)-(N), intelligent storage array 995, or any combination thereof. All or a portion of one or more of the embodiments disclosed herein can also be encoded as a computer program, stored in server 910, run by server 940 and server 945, and distributed to client systems 920 and 930 over network 950.

In some examples, all or a portion of the computing devices in FIGS. 1, 8, and 9 can represent portions of a cloud-computing or network-based environment. Cloud-computing environments can provide various services and applications via the Internet. These cloud-based services (e.g., software as a service, platform as a service, infrastructure as a service, etc.) can be accessible through a web browser or other remote interface. Various functions described herein can be provided through a remote desktop environment or any other cloud-based computing environment.

In addition, one or more of the components described herein can transform data, physical devices, and/or representations of physical devices from one form to another. For example, a secure AV module 150 in FIG. 1 can transform block address information received from a file system into a list of files for scanning.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
    determining a first block address of a changed block, wherein
        the changed block is stored in a first file system, and the first block address is relative to a first file in the first file system; and
    determining a second file that contains the changed block, wherein
        the second file is stored in a file area of a second file system volume, and the second file system volume is stored in the first file in the first file system.

2. The method of claim 1, further comprising:
    translating the first block address relative to the first file in the first file system into a second block address relative to the second file system.

3. The method of claim 2, further comprising:
    comparing the second block address relative to the second file system with a plurality of file addresses relative to the second file system, wherein
        the plurality of file addresses comprises a file address of the second file.

4. The method of claim 3, further comprising:
    in response to a determination that the second block address overlaps the file address of the second file,
        translating the file address relative to the second file system into an other file address relative to the first file system, wherein
            the file address and the other file address are addresses of the second file that contains the changed block.

5. The method of claim 4, further comprising:
    providing the other file address to an anti-virus engine for scanning.

6. The method of claim 1, further comprising:
    retrieving metadata from the first file system, wherein
        the first file system creates a snapshot of data stored in the first file system,
        the snapshot provides a point-in-time view of the data,
        changes made to the data after creation of the snapshot are recorded in the metadata, and
        the determining the first block address uses the metadata.

7. The method of claim 2, wherein the translating further comprises:
    comparing the first block address to a mapping, wherein
        the mapping indicates relationships between addresses of the first file system and the second file system.

8. The method of claim 7, further comprising:
    creating the mapping, wherein the creating comprises:
        correlating a first plurality of addresses of the first file system with a second plurality of addresses of the second file system.

9. A system comprising:
    a network storage device, and
    a secure anti-virus (AV) module configured to
        determine a first block address of a changed block, wherein
            the changed block is stored in a first file system, and
            the first block address is relative to a first file in the first file system, and
        determine a second file that contains the changed block, wherein
            the second file is stored in a file area of a second file system volume, and the second file system volume is stored in the first file in the first file system.

10. The system of claim 9, further comprising:
    a file system (FS) decoder configured to
        translate the first block address relative to the first file in the first file system into a second block address relative to the second file system.

11. The system of claim 10, wherein
    the FS decoder is further configured to
        compare the second block address relative to the second file system with a plurality of file addresses relative to the second file system, wherein
            the plurality of file addresses comprises a file address of the second file.

12. The system of claim 11, wherein
    the FS decoder is further configured to
        translate the file address relative to the second file system into an other file address relative to the first file system, in response to a determination that the second block address overlaps the file address of the second file, wherein
            the file address and the other file address are addresses of the second file that contains the changed block.

13. The system of claim 12, wherein
    the secure AV module is further configured to
        provide the other file address to an anti-virus engine for scanning.

14. The system of claim 9, wherein
    the secure AV module is further configured to
        retrieve metadata from the first file system, wherein
            the first file system creates a snapshot of data stored in the first file system,
            the snapshot provides a point-in-time view of the data,
            changes made to the data after creation of the snapshot are recorded in the metadata, and
            the first block address is determined by using the metadata.

15. The system of claim 10, wherein
    the FS decoder is further configured to
        compare the first block address to a mapping, wherein
            the mapping indicates relationships between addresses of the first file system and the second file system.

16. The system of claim 15, wherein
    the FS decoder is further configured to
        correlate a first plurality of addresses of the first file system with a second plurality of addresses of the second file system to produce the mapping.

17. A non-transitory computer-readable storage medium configured to store program instructions that, when executed on a processor, are configured to cause the processor to perform operations comprising:
    determining a first block address of a changed block, wherein the changed block is stored in a first file system, and the first block address is relative to a first file in the first file system; and determining a second file that contains the changed block, wherein the second file is stored in a file area of a second file system volume, and the second file system volume is stored in the first file in the first file system.

18. The non-transitory computer-readable storage medium of claim 17, wherein the operations further comprise:

translating the first block address relative to the first file in the first file system into a second block address relative to the second file system.

19. The non-transitory computer-readable storage medium of claim 18, wherein the operations further comprise:

comparing the second block address relative to the second file system with a plurality of file addresses relative to the second file system, wherein the plurality of file addresses comprises a file address of the second file.

20. The non-transitory computer-readable storage medium of claim 19, wherein the operations further comprise:

in response to a determination that the second block address overlaps the file address of the second file, translating the file address relative to the second file system into an other file address relative to the first file system, wherein the file address and the other file address are addresses of the second file that contains the changed block.

* * * * *